United States Patent [19]

Fujimoto et al.

[11] 4,310,480
[45] Jan. 12, 1982

[54] PROCESS FOR FABRICATION OF DENSE-STRUCTURE REFRACTORIES WHICH HAVE RESISTANCE TO SPALLING

[75] Inventors: Shyoichiro Fujimoto, Kitakyushu; Haruyuki Ueno, Munakata, both of Japan

[73] Assignee: Kurosaki Refractories Co., Ltd., Fukuoka, Japan

[21] Appl. No.: 969,766

[22] Filed: Dec. 15, 1978

Related U.S. Application Data

[63] Continuation of Ser. No. 763,177, Jan. 27, 1977, abandoned, which is a continuation-in-part of Ser. No. 599,208, Jul. 25, 1975, abandoned.

[30] Foreign Application Priority Data

Aug. 13, 1974 [JP] Japan .................................. 49-92905

[51] Int. Cl.$^3$ ............................................ C04B 33/22
[52] U.S. Cl. ........................................ 264/56; 264/67
[58] Field of Search ............................ 264/56, 30, 117

[56] References Cited

FOREIGN PATENT DOCUMENTS 1246689 9/1971 United Kingdom .

Primary Examiner—John Parrish
Attorney, Agent, or Firm—Jordan and Hamburg

[57] ABSTRACT

A process by which dense structure refractories that have resistance to spalling may be produced which comprises building up secondary particulates from fine and/or ultra-fine particles of primary particulate, separating the thus prepared secondary particulates, reconstituting the batch within a definite range and proportion of particle size composition, molding the thus reconstituted batch under a predetermined pressure and finally firing the above molded material is disclosed.

1 Claim, 6 Drawing Figures

PROCESS FOR FABRICATION OF DENSE-STRUCTURE REFRACTORIES WHICH HAVE RESISTANCE TO SPALLING

REFERENCE TO RELATED APPLICATION

This is a continuation of application Ser. No. 763,177, filed Jan. 27, 1977, now abandoned, which is a continuation-in-part of application Ser. No. 599,208, filed July 25, 1975 now abandoned.

BACKGROUND OF THE INVENTION

This invention relates to a process for production of refractories, more particularly to a process for producing refractories which have highly dense structures as well as high resistance to thermal spalling.

In refractories, although the density of the structure determines other properties such as the mechanical strength and the resistance to corrosion and errosion, those having a highly dense structure generally have a tendency to lack resistance to thermal spalling. Therefore, it has been an object of persons concerned in this line of industry to produce refractories which possess all of the above described desirable properties.

As a solution of the problems encountered in the refractory industry, the present invention has the objective of making possible the fabrication of excellent refractories as above described.

In particular, it is an object of this invention to provide excellent refractories which have highly dense structures as well as resistance to thermal spalling.

It is another object of this invention to provide a process for producing excellent refractories which have all of the above described desirable properties, which process comprises building up secondary particulates as the raw materials for such refractories and limiting the particle size composition of the raw materials to a specified range.

BRIEF DESCRIPTION OF THE DRAWINGS

The features of the present invention and differences thereof from the prior art will be understood more fully and clearly from the following detailed description with reference to the appended drawings in which.

DETAILED DESCRIPTION OF THE INVENTION

Figure 1A:
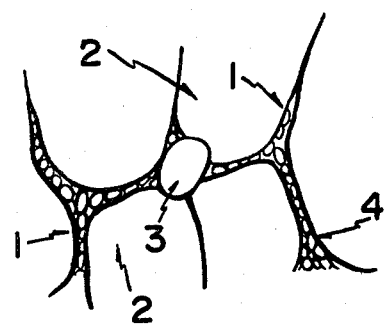
FIG. 1A is a schematic illustration of a boundary region which is formed in alumina refractories according to the present invention.

With the increasingly critical conditions encountered during the service of industrial furnaces, the need for improvement of the properties of refractories is keenly felt.

Broadly speaking, any refractory may be categorized as either an ordinary refractory or a highly dense structure refractory based upon the structure which is defined by the number and sizes of the grains and pores, the manner in which the pores are arranged in the material and the physical strength of the body.

Since ordinary refractories have an apparent porosity of about 10-20% by volume and the porosity of the matrix area is in the range of 30-40% by volume, and since the rate of penetration of slag and molten metal increases rapidly with increasing porosity, these corrosive agents react increasingly with the refractories at high temperatures, accelerating corrosion and errosion and resulting in structural spalling.

On the other hand, highly dense structure refractories which have an apparent porosity of less than 10% by volume and are fabricated by means of the fused casting method or the sintering method, wherein fine and/or ultra-fine particles are used as the raw material, have a characteristic low porosity, high mechanical strength and excellent resistance to corrosion and errosion, but have low spalling resistance. This factor causes them to be unsuitable for service in locations where sudden temperature changes occur and other locations where this type of refractory is employable are also limited.

The phenomenon of thermal spalling is mainly attributed to a sudden temperature change in the refractories, which causes thermal stresses to develop. If these stresses exceed the shear or tensile strength of the refractories, cracks will develop throughout the structure and will bring about the collapse of the refractories. In order to prevent thermal spalling, the employment of a material with either a low expansion coefficient or a high thermal conductivity is advocated. These materials, however, are used for the purpose of precluding the development of thermal stress and not for arresting the development of the crack.

In spite of the fact that there is no difference in composition, as a rule, an ordinary refractory is superior to a dense structure refractory when comparing resistance to thermal spalling during service.

From the above fact, it seems that when the intrinsic nature of resistance to thermal spalling is analyzed, there is an intimate connection thereof to the type of path along which a crack develops, either linearly or irregularly, since all refractories do develop cracks to some extent, rather than any connection thereof to the cause of the crack.

Generally, the crack in the dense structure refractory develops linearly and the fracture that occurs has sharp and smooth edges while the crack in the ordinary refractory develops in a zigzag or irregular manner and the edge of the fracture is ragged. The difference between the types of fractures which occur is due to the difference in the structure of the refractories. That is, the ordinary refractory consists of an aggregate area which has high density and greater bonding strength and a matrix area which has a lower density and less bonding strength. Thus, the crack caused by thermal stress begins to develop and spread through the weaker matrix area, along the line of least resistance, which results in a zigzag or irregular fracture. In the case of a dense structure refractory which has an even structure and uniform bonding strength, a crack will develop in a straight line since no one area is weaker than another.

Based upon the above knowledge, the present inventors have come to feel that in a dense structure refractory, if the weaker matrix area is minimized and distributed irregularly similarly to that of an ordinary refractory, thermal stress will cause irregular rather than linear cracks as in the ordinary refractory and the resistance to thermal spalling will be increased without giving up the advantages of a dense structure refractory. The structure of the modified dense structure refractory is dense and uneven and the crack due to thermal stress develops through the weaker area in the same way as in the ordinary refractory which makes it difficult for the refractory to peel and gives rise to resistance to spalling. Hence, the object of this invention is accomplished.

Accordingly, a most important aspect of this invention is the provision of a process by which there is formed a lower density area with weaker bonding strength which is distributed irregularly to a minimum extent throughout the dense structure refractories. For instance, the dense structure refractory which is made by the sintering method, is usually made by grinding the raw material into a fine and/or ultra-fine powder in which the particle sizes range below 74μ, then grading the resulting particles, blending various materials together, and, finally, molding and sintering the product causing it to shrink and to densify.

At this point, the problem of the molding method using the above fine and/or ultra-fine powder will be discussed. The particles of fine and/or ultra-fine powder have increased surface area and are accompanied by a large quantity of air which interferes with the molding process. To avoid this problem, size enlargement or granulation of these particles of ultra-fine powder by a suitable means such as a granulator, a spray dryer or a pelleting machine is generally employed.

Hereinafter, in this specification, agglomerates which are brought together to form larger particles from fine and/or ultra-fine particles are referred to generally as secondary particulates as compared to those fine and/or ultra-fine particles that are used as raw materials and are referred to as primary particulates.

Referring to the method of enlargement, various methods are employable for the fabrication of secondary particulates. Originally, bodies of primary particulates were brought together to form larger agglomerates by high pressure molding or compacting and the resultant agglomerates were crushed to suitable sizes to form the secondary particulates and then were screened to make a batch of the desired particle size composition. Recently, however, granulation which employs a spray drying technique is being used to form the secondary particulate.

In addition to these two methods, various conventional methods such as extruding, together with crushing and nodulizing, can be employed as circumstances warrant.

The thus prepared secondary particulates are classified and designated according to size as follows:

| classification of the secondary particulates | particle size |
| --- | --- |
| coarse grain | larger than 1mm |
| intermediate grain | 0.5–1mm |
| fine grain | 0.1–0.5mm |
| fine powder | smaller than 0.1mm |

The present inventors feel that by adjusting the quantities of the above particle sizes of secondary particulates within a given percentage range, especially those of the secondary particulate, an irregular distribution of a low density portion will thus occur throughout the structure during firing of the refractory, whereby cracks due to thermal stress can be controlled. Therefore, the most important element of this invention lies in the process which comprises granulating the fine and/or ultra-fine particles of the raw material to form the secondary particulate, adjusting the particle size composition of the thus prepared secondary particulate in a definite ratio and molding and sintering whereby the irregular distribution of the low density portion in the dense structure refractory is effected, thereby increasing resistance to thermal spalling.

It has been found and confirmed by the present inventors from molding and firing experiments in which a mixture of materials of various particle size composition were used that a larger proportion of fine powder in the secondary particulate causes unfavorable results with regard to the spalling resistance of the fired refractories. It also has been found that the spalling resistance depends upon the amount of secondary particulate of particle size less than 0.1 mm. Further, it has been found that the proportion of the secondary particulate of said particle size should be less than 10% by weight and the smaller the proportion is, the more remarkable is the increase in spalling resistance. All proportions hereinafter are by weight unless otherwise indicated.

When the minute presence of primary particulate, the particle size of which is less than 0.1 mm is unavoidable, if the total proportion of the primary particulate plus the secondary particulate of particle size less than 0.1 mm is less than 10%, molding can be accomplished by using an oil press without lamination and the spalling resistance will be increased. In this case, a small decrease in bulk specific gravity is observed.

The proportion of the fine grain particles of the secondary particulate which have the size of 0.1–0.5 mm should be from 0 to 30% in order to obtain a dense structure refractory. The smaller the proportion of fine grain particles of 0.1–0.5 mm is, the more the spalling resistance is increased. In the case where the proportion of fine grain particles of 0.1–0.5 mm is more than 40%, the bulk specific gravity decreases remarkably although the spalling resistance is increased. It is necessary then to maintain the proportion of fine grain particles at less than 30% for a dense structure refractory.

The most desirable results are obtained with respect to spalling resistance in a dense structure refractory when the proportions of the fine powder, fine grain and more coarse particles are kept within specified ranges. The proportion of finely powdered particulate of less than 0.1 mm in size should be from 0 to 10% and in some cases, the primary particulate itself is employed alone or in addition to the secondary particulate of this size. The proportion of fine grain particles of the secondary particulate of the 0.1–0.5 mm size range should be from 0 to 30% and the balance, 60–100%, should be composed of particles of the secondary particulate which are as coarse or coarser than the intermediate grain size and are larger than 0.5 mm. The smaller the proportions of the finely powdered and the fine grain secondary particulates are, within the above specified ranges, the more the desired results are obtained. Based upon the above mentioned discoveries, the present invention has been accomplished.

Figure 1B:
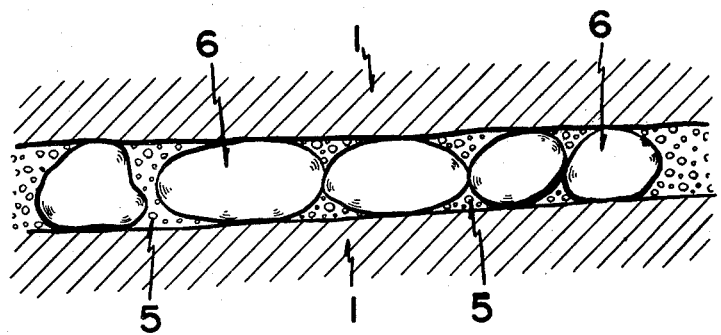
FIG. 1B is an enlarged illustration of the boundary region of FIG. 1A.

In the case of alumina refractories, for example, FIG. 1A and 1B are schematic diagrams which show the structure of the refractories that are obtained by molding followed by firing a mixture of the particle size composition that consists of 5% of a secondary particulate which is less than 0.1 mm in size, 15% of a secondary particulate which is within the range of 0.1–0.5 mm in size, 30% of a secondary particulate which is within the range of 0.5–1 mm in size and 50% of a secondary particulate which is 1–3 mm in size, according to the above mentioned technical concept. FIG. 1A schematically illustrates a boundary region that is formed between the fine powder and fine grain secondary particulate and the intermediate and coarse grain secondary particulate in alumina refractories. FIG. 1B is an enlarged illustration of the boundary region. In FIG. 1A, 1 refers to the coarse grain secondary particulate, 2 indicates the coarse grain secondary particulate which was deformed by pressing, 3 shows the intermediate grain secondary particulate and 4 represents the boundary region which was formed from the fine grain secondary particulate. FIG. 1B is an enlarged illustration of the region, in which 1 is the coarse secondary particulates, 5 is the finely powdered secondary particulate and 6 is the fine grain secondary particulates. The coarse and intermediate grain secondary particulates become a high density area and the boundary region forms a low density area. This heterogeneity of the structure increases the spalling resistance. Cracks caused by thermal stress develop in zigzag manner along this low density area. This area plays some role in increasing the density rather than acting as an interstice.

Spalling resistance is increased without a decrease of porosity when a fine particle of secondary particulate is appropriately mixed into the boundary region which is formed by the fine grain secondary particulates. But mixing an excess of the finely powdered secondary particulate causes unification of the coarse grain and intermediate grain secondary particulate with the boundary region, and the structure becomes homogeneous, which decreases spalling resistance.

The above described characteristics are observed not only in the aluminous refractories referred to hereinabove, but also in all refractories made of secondary particulate or from basic substances such as magnesite, magnesite-chromic oxide, chromic oxide-magnesite or magnesite-alumina, acidic substances such as alumina-silica, zircon or zirconia and neutral substances such as alumina or chromic oxide fine and/or ultra-fine materials.

In all cases, refractories with excellent spalling resistance and structure similar to the illustration in FIG. 1 are obtained. In carrying out the present invention, a binder and a sintering agent which is usually used may be employed instead of the major materials. It is desirable that molding be performed with appropriate molding pressure so that the secondary particulate will not be completely destroyed.

Figure 2:
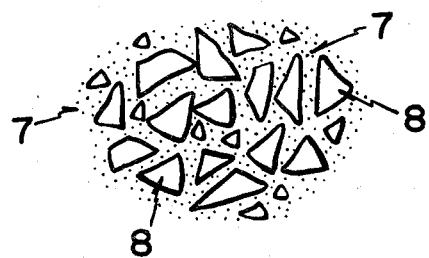
FIG. 2 is a schematic diagram of the structure of conventional refractories.

In order to show the superiority of the refractories obtained according to the present invention when compared to those obtained by conventional methods, a schematic diagram, FIG. 2, of the structure of conventional refractories is presented. In this diagram, 7 shows the matrix area and 8 is the aggregate. It is evident from comparison of this diagram with FIG. 1 that the structure of dense structure refractories which are obtained according to the present invention consists of a very small area of low density and large area of high density. On the contrary, conventional refractories contain a large matrix area of low density. Therefore, it can be concluded that dense structure refractories which are produced according to the present invention not only possess a desirable highly dense structure but also an increased spalling resistance in that the structure consists of a large area of highly dense structure and a small area of less dense structure.

During the pressure molding of the batch consisting of secondary particulates, particles of the secondary particulates which originally have been spaced to some degree from each other come nearer as pressure increases at the beginning of the molding operation and the area of the surfaces thereof in mutual contact consequently becomes larger.

Subsequently, the particles are deformed as the pressure increases, which results in filling of the spaces between the particles and, then, finally, the spaces are filled completely to produce a unified structure.

Figure 3A:
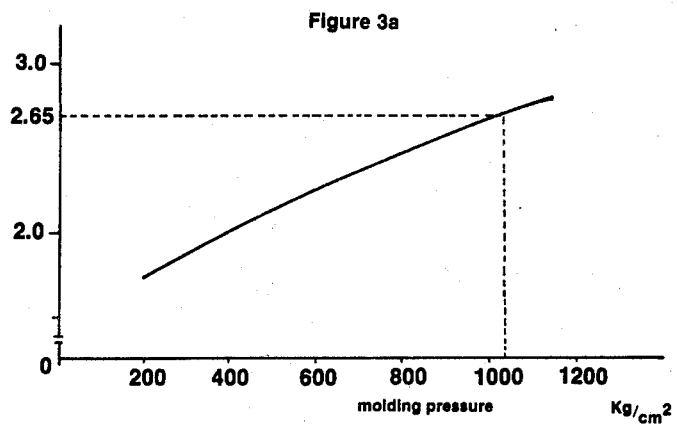
FIGS. 3A, B and C are plots of bulk specific gravity versus molding pressure.

FIG. 3A shows the way in which molding pressure (abscissa) acts on the bulk specific gravity (ordinate) of the green body consisting of alumina secondary particulate which is subjected to the pressure. In this experiment average bulk specific gravity of the alumina secondary particulate used herein, which is represented by $p_o$, is 2.65. As the molding pressure increases, the bulk specific gravity of the green body consisting of secondary particulate (p) increases, and when the pressure is 1030 kg/cm$^2$, the specific gravity has the value 2.65, which is in agreement with that ($p_o$) of the secondary particulate used and means that under this pressure most of the space between the particles will disappear by being closely filled up with the material of the particles. The more the pressure increases beyond this point, the more the bulk specific gravity of the green body will increase as is shown in FIG. 3A. This means that the distance between the particles of primary particulate which built up the secondary particulate become smaller as the pressure increases and the density of the green body consequently becomes greater.

Figure 3B:
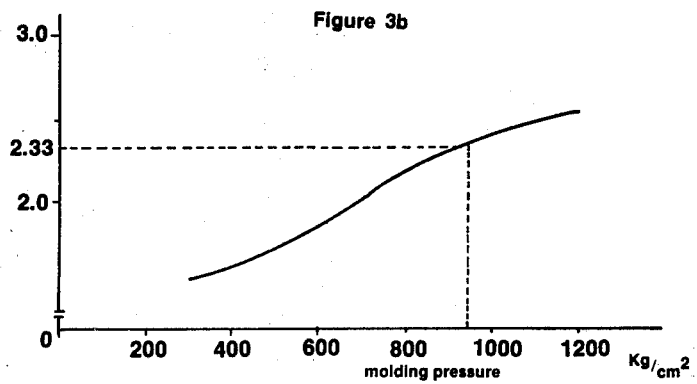

FIG. 3B shows a similar relation between molding pressure and bulk specific gravity when the secondary particulate is magnesia particles having an average bulk specific gravity ($p_o$) of 2.33. The bulk specific gravity of the green body consisting of the magnesia secondary particulate becomes equal to $p_o$ at the molding pressure of 950 kg/cm$^2$ where most of the space existing between particles of the secondary particulate disappears.

The present inventors have found that there exists the following relationship between the value of the bulk specific gravity of the molded green product and the properties of the fired refractory product obtained therefrom.

If the bulk specific gravity (p) of the molded green product consisting of the secondary particulate is greater to some degree than that ($p_o$) of the secondary particulate used for fabricating the green product, the low density area which is necessary for the resistance to spalling will scarcely be formed in the structure of the fired product obtained from the molded green product, which results in poor spalling resistance of the fired brick.

If the bulk specific gravity (p) of the molded green product is lower to some degree than that ($p_o$) of the secondary particulate used for fabricating the green product, many cracks will develop in the structure of the fired brick obtained from the green product. The reason is that since the secondary particulate consists of ultra-fine particles, shrinkage produced in the particles of the secondary particulate by the sintering results in pulling apart of the particles from each other.

Consequently, for keeping spalling resistance as well as dense structure of less than 10% apparent porosity, the value of the bulk specific gravity of the green product consisting of the secondary particulate should be chosen within a certain range. As a result of experiments, the present inventors have concluded that by applying empirically determined pressures in the pressure molding, the value of the bulk specific gravity of the green product, p, can be adjusted in the range of 0.95 to 1.00 of the value of the average bulk specific gravity of the secondary particulate, $p_o$, which is shown in Table 1. In other words, the relationship can be expressed by the following equation:

$$0.95 \leq p/p_o \leq 1.00$$

As shown in Table 1, for obtaining the dense structure refractories which have spalling resistance in accordance with the present invention, it is required to adjust the pressure in pressure molding so that the ratio of p to $p_o$ is in the range of from 0.95 to 1.00. To fully understand the present invention, it is important also to realize that the primary particulate and the secondary particulate show quite different behavior in the pressure molding, which results in different structures and physical properties of the respective fired products obtained therefrom.

Figure 3C:
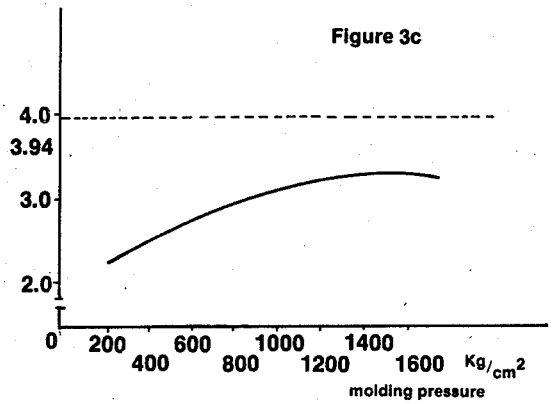

In the case of the ordinary particulate, as the pressure acting on the green body consisting of the ordinary particulate increase, the density of the particles tends to increase but they do not crumble. Thus the bulk specific gravity of the green body does not reach the values as great as or greater than the average bulk specific gravity of the ordinary particulate. This is shown in FIG. 3C wherein the solid line indicates change of the bulk specific gravity of the green body consisting of the ordinary particulate with pressure and the broken line indicates average bulk specific gravity (3.94) of the ordinary particulate. Sintering shrinkage can scarcely by observed in the case of firing of the primary particulate (less than 1%).

In the case of the secondary particulate, as the pressure increases:

(1) The distance between the particles of the secondary particulate becomes smaller and the bulk specific gravity of the green body consisting of the secondary particulate increases.

(2) Then, a limit is reached where every particle of the secondary particulate is in close contact with other of the particles of the secondary particulate and essentially no space is observable between them, the bulk specific gravity of the green body now being equal to the average bulk specific gravity of the secondary particulate.

(3) If the pressure exceeds the above limitation, the particles of the secondary particulate will deform and collapse so that the bulk specific gravity of the green body will come to be more than the average bulk specific gravity of the secondary particulate as shown in FIG. 3A and FIG. 3B. Since the secondary particulate consists of ultra-fine primary particles, significant sintering shrinkage of the secondary particulate is observed (more than 5%).

EXAMPLE 1

To an alumina refractory raw material consisting of fine and/or ultra-fine powder with a particle size of less than 44μ, 3% by weight of polyvinyl alcohol is added and then, after blending while heating, the raw mixture is subjected to granulation by a conventional method such as pelleting, pressing, extrusion, slip casting or spray drying to form predetermined sizes of coarse or fine grains up to 5 mm.

Following the granulation process is the screening process by which the built up product is classified into the following five groups of desired particle size:

3-5 mm
1-3 mm
0.5-1 mm
0.1-0.5 mm
less than 0.1 mm

The thus produced secondary particulates of various particle sizes are subsequently reconstituted to make ready for molding a batch of the desired particle size composition which is shown in the following Table 1, and the thus obtained batch is molded into green products of 300×200×150 mm under a predetermined pressure between 300 and 1500 kg/cm² at which the ratio of $p/p_o$ is equal to the value as shown in the Tables. These products are finally fired at a conventional temperature of 1600°–1800° C., for example 1700° C. for 10 hours to produce the desired refractories, the characteristics of which are shown in Table 1.

TABLE 1

| | No. 1* | No. 2 | No. 3* | No. 4 | No. 5 | No. 6 | No. 7 | No. 8 | No. 9 | ordinary particulate***** | | | |
|---|---|---|---|---|---|---|---|---|---|---|---|---|---|
| | | | | | | | | | | No. 10 | No. 11 | No. 12 | No. 13 |
| particle size | | | | | | | | | | | | | |
| 3-5 mm | | | | | | | 30 | 30 | | | 30 | | |
| 1-3 mm | | | 60 | 60 | 50 | 50 | 40 | 40 | 50 | 40 | 40 | 60 | 30 |
| 0.5-1 mm | 40 | 60 | 5 | 30 | 30 | 30 | 15 | 30 | 20 | ⎫ 20 | 30 | 30 | 30 |
| 0.1-0.5 mm | 40 | 30 | 5 | 0 | 15 | 20 | 15 | 0 | 30 | ⎭ | 0 | 0 | 30 |
| smaller than 0.1 mm | 20 | 10 | 30 | 10 | 5 | 0 | 0 | 0 | 0 | 40 | 0 | 10 | 10 |
| apparent specific gravity | 3.78 | 3.83 | 3.82 | 3.76 | 3.87 | 3.80 | 3.86 | 3.88 | 3.81 | | 3.96 | 3.87 | 3.85 |
| bulk specific gravity | 3.46 | 3.54 | 3.55 | 3.61 | 3.64 | 3.62 | 3.64 | 3.53 | 3.52 | 3.22 | 3.13 | 3.20 | 3.24 |
| apparent porosity (%) by volume | 8.3 | 7.5 | 6.9 | 4.1 | 6.0 | 6.5 | 4.2 | 8.6 | 9.2 | 15.6 | 21.0 | 17.3 | 15.8 |
| panel spalling test, the number of times** | 1 | 3 | 1 | 6 | 6 | 7 | 11 | 12 | 11 | 20 | 13 | 16 | 21 |

TABLE 1-continued

|  | No. 1* | No. 2 | No. 3* | No. 4 | No. 5 | No. 6 | No. 7 | No. 8 | No. 9 | ordinary particulate****** | | | |
|---|---|---|---|---|---|---|---|---|---|---|---|---|---|
|  |  |  |  |  |  |  |  |  |  | No. 10 | No. 11 | No. 12 | No. 13 |
| p/p₀ | 0.96 | 0.97 | 0.96 | 0.98 | 1.00 | 1.00 | 1.00 | 0.98 | 0.95 | *** | **** | ***** | |

Notes:
*No. 1 and No. 3 are control groups.
**The conditions for the test:
Specimens for the test were a standard shaped brick of 230 × 114 × 65 mm, the test consisting of heating one side of the specimen in a laboratory furnace at 1200° C. for 15 minutes and subsequently cooling it in cold air and repeating this heating and cooling. The results are expressed as the number of times the specimen will stand this treatment without spalling.
***Inferior appearance, very brittle.
****Slightly inferior appearance, brittle.
*****Pleasing appearance.
******No. 10 to 13 indicate the particle size distributions of respective batches of green product and the properties of the respective fired products obtained therefrom under the same conditions as for the secondary particulate.

As shown in Table 1, the refractory materials prepared according to the present invention are superior in structure as well as resistance to spalling when compared to those of the prior art.

EXAMPLE 2

Polyvinyl alcohol, 3% by weight, is added to magnesia raw material consisting of fine and/or ultra-fine powder of the primary particulate with a particle size of less than 44μ and then the fine and/or ultra-fine powder in the above raw mixture is formed into a larger grain secondary particulate by blending while heating. Following the above granulation process, the built up product is separated into the five groups according to size by a screening procedure. The thus produced secondary particulates of different particle sizes are subsequently reconstituted to make a batch of the mixture of each of the particle size compositions shown in Table 2 and each thus obtained batch is molded into a product of the standard dimensions of 300×20×150 mm under a predetermined pressure between 300 and 1500 kg/cm² at which the ratio of p/p₀ is equal to the value as shown in the Tables using an oil press. These products are finally fired at a temperature of 1700° C. for 10 hours to produce the desired refractories, the characteristics of which are shown in Table 2.

From the above results, it can be seen that the refractories according to the present invention are superior in density as well as resistance to spalling when compared to those of the prior art. The above results also demonstrate the significance of parameters of the invention. If secondary particulate is used but not of the proper grain size range, spalling resistance was not obtained (No. 1 and 3 of Table 1 and No. 1 and 2 of Table 2) with the exception of No. 2 of Table 2. If the proper grain size range but not the secondary particulate is used, the necessary dense structure could not be obtained (No. 10–13 of Table 1 and No. 7–9 of Table 2). It is thus demonstrated that employing the secondary particulate as well as the proper grain size range are necessary for obtaining dense structure refractories which have spalling resistance in accordance with the present invention (No. 4–9 of Table 1 and No. 3–6 of Table 2). The following table, Table 3, summarizes the data in Tables 1 and 2.

TABLE 2

|  | No. 1* | No. 2* | No. 3 | No. 4 | No. 5 | No. 6 | ordinary particulate | | |
|---|---|---|---|---|---|---|---|---|---|
|  |  |  |  |  |  |  | No. 7 | No. 8 | No. 9 |
| particle size |  |  |  |  |  |  |  |  |  |
| 3–5 mm |  | 15 | 25 | 20 | 25 |  | 20 | 25 | 0 |
| 1–3 mm | 10 | 45 | 45 | 50 | 40 | 40 | 50 | 45 | 30 |
| 0.5–1 mm | 20 | 15 | 15 | 20 | 5 | 20 | 20 | 15 | 30 |
| 0.1–0.5 mm | 40 | 15 | 10 | 10 | 30 | 0 | 10 | 10 | 30 |
| smaller than 0.1 mm | 30 | 20 | 5 | 0 | 0 | 0 | 0 | 5 | 10 |
| apparent specific gravity | 3.31 | 3.40 | 3.33 | 3.33 | 3.35 | 3.40 | *** | 3.47 | 3.44 |
| bulk specific gravity | 3.26 | 3.11 | 3.23 | 3.19 | 3.08 | 3.10 | *** | 2.81 | 2.94 |
| apparent porocity (%) by volume | 1.2 | 8.3 | 2.9 | 4.3 | 8.0 | 8.80 | *** | 19.0 | 14.3 |
| panel spalling test number of times** | 1 | 1 | 6 | 7 | 7 | 8 | *** | 11 | 9 |
| P/Po | 0.99 | 0.97 | 1.00 | 1.00 | 0.97 | 0.98 |  |  |  |

Notes:
*No. 1 and No. 2 are control groups.
**Conditions for the panel spalling test are the same as those of Table 1.
***Cannot be molded.

TABLE 3

| TABLE OF SUMMARY | THE EXPERIMENTAL DATA | | |
|---|---|---|---|
|  | proper grain size range | Secondary particulate | dense structure | spalling resistance |
| Table 1 |  |  |  |  |
| No. 1 | X | O | O | O |
| 2 | O | O | O | Δ |
| 3 | X | O | O | X |
| 4 | O | O | O | O |
| 5 | O | O | O | O |
| 6 | O | O | O | O |
| 7 | O | O | O | O |
| 8 | O | O | O | O |
| 9 | O | O | O | O |
| 10 | X | X | X | ⊚ |
| 11 | O | X | X | ⊚ |
| 12 | O | X | X | ⊚ |
| 13 | O | X | X | ⊚ |
| Table 2 |  |  |  |  |
| 1 | X | O | ⊚ | X |
| 2 | X | O | ⊚ | X |
| 3 | O | O | ⊚ | O |
| 4 | O | O | ⊚ | O |
| 5 | O | O | O | O |

TABLE 3-continued

| TABLE OF SUMMARY | | THE EXPERIMENTAL DATA | | |
|---|---|---|---|---|
| | proper grain size range | Secondary particulate | dense structure | spalling resistance |
| 6 | ○ | ○ | ○ | ○ |
| 7 | ○ | X | X | X |
| 8 | ○ | X | X | X |
| 9 | ○ | X | X | |

Note:
⊚ very good
○ fullfill the requirement or good
△ not so good
X not fulfill the requirement or bad

TABLE 4

Relationship between the P/Po value of the green bodies prepared by molding batches having the given particle size composition of secondary particulate and the properties of the refractories obtained by firing said green bodies.

| | material | alumina | | | | | | | |
|---|---|---|---|---|---|---|---|---|---|
| | bulk specific gravity of the secondary particulate used | 2.65 | | | | 2.61 | | | |
| | P/Po | 0.88 | 0.95 | 1.00 | 1.04 | 0.85 | 0.95 | 1.00 | 1.07 |
| | particle size composition | | | | | | | | |
| | 3-5 | | 30 | | | | 0 | | |
| | 1-3 | | 40 | | | | 0 | | |
| | 0.5-1 | | 15 | | | | 40 | | |
| | 0.1-0.5 | | 15 | | | | 40 | | |
| | <0.1 | | 0 | | | | 20 | | |
| properties after firing | apparent specific gravity | 3.87 | 3.80 | 3.80 | 3.80 | 3.82 | 3.81 | 3.78 | 3.78 |
| | bulk specific gravity | 3.28 | 3.52 | 3.64 | 3.66 | 3.31 | 3.54 | 3.63 | 3.68 |
| | apparent porosity (%) by volume | 15.3 | 9.0 | 4.2 | 3.8 | 13.3 | 7.2 | 4.0 | 2.4 |
| | cracking | many | no | no | no | slightly | no | no | no |
| | panel spalling test, the number of times | 0 | 20 | 11 | 2 | 2 | 2 | 1 | 1 |

TABLE 5

Relationship between the P/Po value of the green bodies prepared by molding batches having the given particle size composition of secondary particulate and the properties of the refractories obtained by firing said green bodies.

| | material | magnesia | | | | | | | | |
|---|---|---|---|---|---|---|---|---|---|---|
| | bulk specific gravity of the secondary particulate used | 3.33 | | | | | 2.34 | | | |
| | P/Po | 0.91 | 0.95 | 0.97 | 1.00 | 1.07 | 0.90 | 0.95 | 0.99 | 1.00 | 1.09 |
| | particle size composition | | | | | | | | | | |
| | 3-5 | | | 20 | | | | | 0 | | |
| | 1-3 | | | 50 | | | | | 10 | | |
| | 0.5-1 | | | 20 | | | | | 20 | | |
| | 0.1-0.5 | | | 10 | | | | | 40 | | |
| | <0.1 | | | 0 | | | | | 30 | | |
| properties after firing | apparent specific gravity | 3.46 | 3.43 | 3.36 | 3.33 | 3.30 | 3.38 | 3.35 | 3.31 | 3.32 | 3.32 |
| | bulk specific gravity | 3.02 | 3.13 | 3.17 | 3.19 | 3.21 | 3.01 | 3.21 | 3.26 | 3.28 | 3.29 |
| | apparent porosity (%) by volume | 12.6 | 8.7 | 5.6 | 4.3 | 2.7 | 11.0 | 4.3 | 1.2 | 1.1 | 1.0 |
| | cracking | cracked | no | no | no | no | cracked | no | no | no | no |
| | panel spalling test, the number of times | 11 | 10 | 8 | 7 | 2 | 4 | 2 | 1 | 1 | 1 |

Finally, Table 4 (for alumina) and Table 5 (for magnesite) demonstrate the significance of the aforementioned $p/p_o$ ratio as a parameter of the process of the invention.

What is claimed is:

1. In a process for fabricating dense refractories from at least one refractory material selected from the group consisting of magnesite, magnesite-chromic oxide, chromic oxidemagnesite, magnesite-alumina, alumina-silica, zircon, zirconia, alumina and chromic oxide, the improvement comprising:

(a) grinding said refractory materials into fine and/or ultra-fine powder of less than 74μ of primary particulate, (b) reconstituting said fine and/or ultra-fine powder into agglomerates of secondary particulate, (c) blending said agglomerates of secondary particulates to make a batch having the following particle size composition:

| | |
|---|---|
| a fine powder of secondary particulates and primary particulate with a particle size less than 0.1 mm | 0–10% by weight |
| a fine grain of secondary particulates with a particle size of 0.1 to 0.5 mm | 0–30% by weight |
| an intermediate and a coarse grain of secondary particulates with a particle size that is greater than 0.5 mm | the balance of the mixture |

(d) molding the thus blended batch, (e) adjusting the molding pressure so that the ratio of $p/p_o$ lies in the range of 0.95 to 1.00, wherein p represents the bulk specific gravity of the resultant molded green body and $p_o$ represents the average bulk specific gravity of said secondary particulate used for preparing said green body, and (f) firing at a temperature of 1600° to 1800° C. the molded green body, thereby to produce a dense structure refractory having an apparent porosity of less than 10% by volume and having high resistance to spalling.

* * * * *